Figure 1:
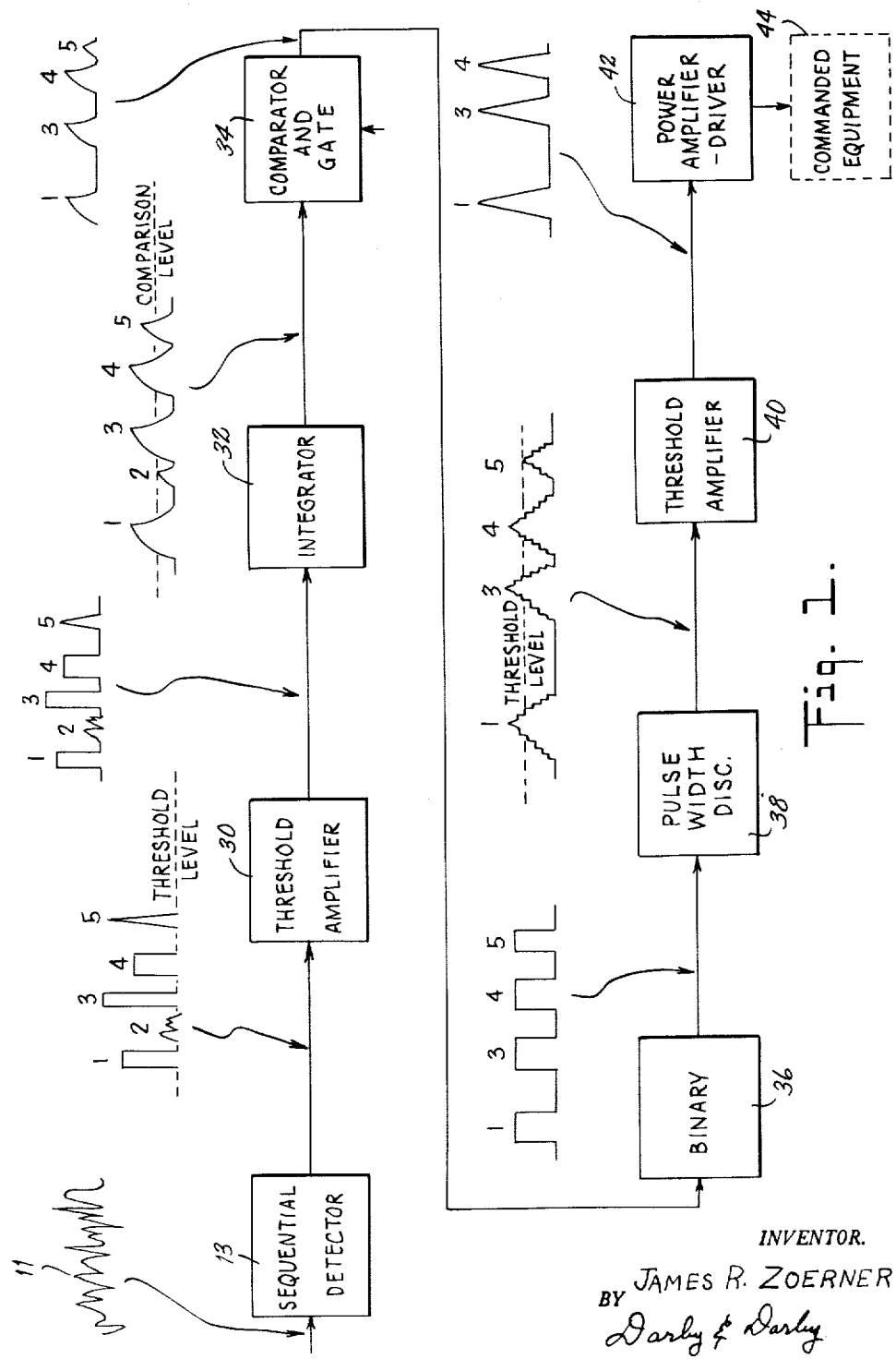

INVENTOR.
JAMES R. ZOERNER
BY Darby & Darby
ATTORNEYS

# United States Patent Office 3,086,174
Patented Apr. 16, 1963

3,086,174
SIGNAL ENERGY DISCRIMINATOR
James R. Zoerner, Cincinnati, Ohio, assignor to Avco Corporation, Cincinnati, Ohio, a corporation of Delaware
Filed Sept. 7, 1960, Ser. No. 54,442
1 Claim. (Cl. 328—139)

This invention relates to communication systems and more particularly to a system for deriving intelligence signals from a composite signal which contains the intelligence signal, noise and other undesirable signals, by an energy factor, or time-amplitude product, analysis of the composite signal.

As is well known, there are many types of electronic equipment which are designed to operate in response to remotely produced command (control) signals. One such type of equipment is the electronic equipment in an artificial earth satellite which is commanded to perform certain operations, such as to turn on a transmitter and/or to transmit stored information, make certain measurements, eject data capsules, etc., by signals which are transmitted from a ground control station. Other such types of equipment include missile guidance systems which operate in response to information telemetered from a ground control station. Still other types of commanded electronic equipment are found in airborne or ground-based equipment which receives control signals from either an airborne or a surface based source.

It is generally desired to achieve as high a degree of operational reliability in such types of commanded equipment as possible. In many cases, the use to which the commanded equipment is put requires positive operation with less than one failure in a million actions, or better than .0001% accuracy.

Most commanded (remote) equipment operates under the control of telemetered signals which are a series of pulses transmitted from a control station. The command signals are received and examined at the remote station to obtain the control information from the pulse width or pulse amplitude. In many instances the transmitted control signals may be subject to disturbing factors which impair their usefulness at the remote equipment. These factors include atmospheric noise, "white noise," equipment noise, other factors inherent in the transmitter-receiver system which amplitude-modulates the transmitted signal, and artificial signals including noise and pulse signals which are transmitted to jam the transmitted signal, etc.

In many cases, after being modified by the disturbing factors, both natural and man-made, the signals received by the remote equipment are not able to control the equipment and in some cases cause it to operate improperly. For example, when the control signals are pulse width modulated to convey information, a pulse of a correct width can be made to convey misinformation by the introduction of amplitude noise. Also, some pulse width discriminators are fooled easily by the introduction of pulse trains which present essentially synchronous (coincident) start and finish indications to the transmitted information pulses. In both cases the remote equipment could not operate in response to the modified intelligence signals or else it would operate improperly.

In accordance with the present invention, a system is provided for the positive selection of intelligence signals from a composite signal field containing the intelligence signals and high order natural and man-made interference. This selection results in the automatic and positive recognition of coded messages in the presence of natural and/or intentional signal interference. The system of the present invention prevents action of the commanded equipment in response to natural or man-made misinformation and effects positive action of the remote equipment when commanded. The present invention is particularly useful for telemetered control as achieved by coded pulse-time signals and also in signal detection equipment which is subjected to extreme countermeasures action. The system is particularly useful in coded communication systems wherein close signal spacing and signal repetition characteristics afford a signal comparison on an energy basis.

In the present invention, it is the energy factor of the modulated composite signal which is interpreted to derive the intelligence therefrom rather than the amplitude, pulse width, or combinations thereof. This is accomplished by analyzing the received composite signal for the probability of occurrence of potential intelligence data and forming signals representative thereof. The probable intelligence data signals are then threshold amplified in order to discard signals which are obviously not intelligence signals. The remaining probable intelligence data signals are then integrated and the integrated signals are compared with a pre-set form or amplitude waveform. Integrated signals having less than the pre-set amplitude, which corresponds to a certain energy level, are discarded. After comparison, the remaining integrated signals are reformed into pulses. The widths of the pulses are measured and signals are produced whose amplitudes are representative of the respective pulse widths. Signals which exceed a predetermined threshold amplitude are representative of those pulses having a pulse width sufficient to identify them as the originally transmitted command signals. These signals which correspond to the original command signals are then amplified and used to control the commanded equipment.

It is therefore an object of this invention to provide a system which automatically selects and positively recognizes coded messages in the presence of natural and/or intentional interference.

Another object of this invention is to provide a system for recognizing and selecting coded messages from a composite signal containing noise or intentional interference by the analysis of the energy content of the composite signal.

Still a further object of the invention is to provide a system for the automatic selection and identification of coded pulse-time signals from a composite signal containing noise and/or intentional interference.

Figure 2:
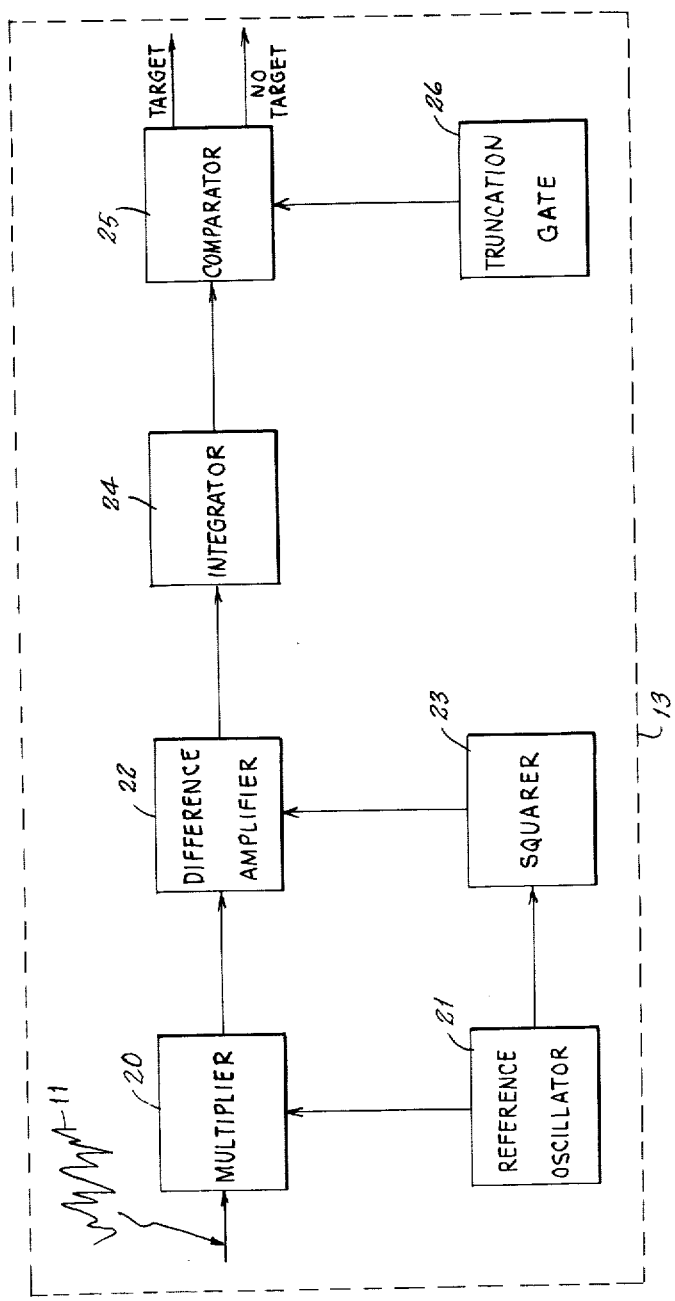

Other objects and advantages of the present invention will become more apparent upon reference to the following specification and annexed drawings in which:

FIGURE 1 is a schematic block diagram of a preferred embodiment of the invention; and FIGURE 2 is a schematic block diagram of the seqential detector of FIGURE 1.

Referring to FIGURE 1, the envelope of a composite signal containing coded intelligence information and high order natural and man-made interference is shown at 11. This signal may be considered to be a video signal, which is the information carrying envelope of an incoming signal, either amplitude or frequency modulated, after suitable R.F. amplification, intermediate frequency amplification, detection, etc. The composite signal 11 is applied to the input of a sequential detector 13. If desired an amplifier (not shown) may be placed before the sequential detector. The amplifier may incorporate automatic gain control and/or amplitude limiting to clip off large positive and negative noise peaks. The amplifier should be able to handle either amplitude modulated or frequency modulated signals and should be linear.

The sequential detector 13 analyzes the signal 11 and states the probability of the occurrence of an intelligence signal. This is done by inferential statistical methods similar to those which are described by A. Wald in a text entitled "Sequential Analysis," published by Wiley in 1947. This analysis draws, to a limited degree, on the Neyman-Pearson likelihood theory.

In a preferred form of the invention, the sequential detector 13 is of the type which analyzes the signal 11, which contains both noise and desired intelligence signals, on the basis of first and second threshold (amplitude) levels. The upper threshold level corresponds to a desired signal plus noise and an indication of exceeding this level corresponds to the appearance of a "target" or desired signal. The lower threshold level corresponds to noise only and an indication of signals below this level corresponds to "no target," i.e. no desired signal. The region between the two thresholds corresponds to no decision, meaning that the signal applied to the receiver and the sequential detector stayed wholly in the region between the upper and lower threshold levels.

Referring to FIGURE 2, a schematic block diagram of a preferred form of sequential detector which may be utilized with the present system is shown. This detector performs the function of evaluating an integral of the form (1) $$S_0^T[a^2s^2(t) - 2a \times (t)s(t)]dt$$

where $s(t)$ is a reference signal, $x(t)$ is the received signal pulse noise, and "$a$" is a constant. In FIGURE 2 the composite input signal 11 is applied to the input of a multiplier 20 which has as its other input the signal from a reference oscillator 21. The input signal 11 and the reference frequency from the oscillator 21 are multiplied together to form the last term of Expression 1, and the multiplier output signal is applied to the input of a difference amplifier 22. The reference frequency signal from oscillator 21 is squared in a squarer circuit 23, to form the first term of (1), and the output of this circuit is applied to the other input of the difference amplifier 22. Amplifier 22 takes the difference between the signals from the squarer 23 and the multiplier 20 and applies it to the input of an integrator 24, which integrates the output of the difference amplifier 22 over a period of time. The time constant of the integrator circuit 24 is made such as to satisfy Equation 1 above. The output of the integrator 24 is applied to the input of a comparator circuit 25. Comparator 25 has two output lines, "target" and "no target," corresponding to the output of the integrator 24 being greater than the upper threshold level or lower than the lower threshold level, respectively.

In operation, the output of the sequential detector starts in the region of no decision, between the two threshold levels, and remains there until either threshold is exceeded at which time the appropriate indication of "target" or "no target" is produced. The time required to reach a decision is variable, being influenced by the signal-to-noise ratio, false alarm rate, etc. For those statistically rare cases where the decision time becomes excessively long—i.e., neither threshold is crossed—the test is terminated or truncated, by the truncation gate 26 and a decision is made by conventional decision methods.

In accordance with the operation of the present invention, the "target" and "no target" thresholds of the sequential detector may be pre-set in some instances. In a preferred form of the invention, the thresholds are made to automatically follow the average no signal (noise) parameter of the input signal and to adjust the lower and upper threshold levels therefrom.

It has been derived that the output of the sequential detector shows that transmitted intelligence signal pulses may be conditioned by noise in a manner such that it appears that the sequential detector output pulses vary in width and amplitude. However, it has been determined that the noise conditioned intelligence signal pulses contain essentially the same energy, even though they appear to vary in pulse width and amplitude. On the other hand, noise pulses contain comparatively less energy. This factor, the energy content of the pulses, is evaluated by the system to provide positive selection and identification of the intelligence signal pulses.

The signals on the two output lines of the comparator 25 are combined to form the output of the sequential detector 13. A typical detector output is shown in FIGURE 1 by the pulses 1, 2, 3, 4 and 5. The pulses 1–5 at the output of the sequential detector 13 represent various signal and noise pulses. For example, pulses 1, 3 and 4 are intelligence pulses of a certain width which are noise conditioned while pulses 2 and 5 are caused solely by jamming signals or noise and contain no intelligence.

The output of the sequential detector 13 may contain low amplitude rubble which need not be handled any further in the system since it is apparent that the rubble contains no intelligence. The low amplitude rubble is eliminated by a threshold amplifier or base clipper circuit 30. The threshold level for the amplifier 30 may be set automatically by the average detector output signal content to accept only signals of a precisely defined amplitude which might carry the intelligence. This can be accomplished by integrating the respective detector output pulses 1–5 in a separate circuit and using the output of that circuit to establish the threshold level. However, in a preferred embodiment of the invention, the threshold level is pre-set since it has been established that this level can be selected and left fixed for long periods of time between established stations.

Each of the pulses 1–5 is integrated in an integrator circuit 32 before comparison with a previously established acceptance energy level in a comparator and gate circuit 34. The integrator 32 accentuates the pulses containing the intelligence since they have the largest energy factor. In FIGURE 1, it can be seen that at the output of the integrator waveforms 1, 3 and 4, which correspond to the pulses 1, 3 and 4 which contain intelligence are greater in amplitude and duration than waveforms 2 and 5 which are formed by noise.

The comparator and gate circuit 34 is preferably a threshold amplifier having a variable comparison (threshold) level. The threshold level of the comparator and gate circuit 34 is set to base clip the integrated signal at a fixed percentage of the peak integrated signal amplitude within a clocked interval, thereby establishing a base energy acceptance level. In this manner, likely wrong (unwanted) information is filtered out of the wave train. The length of the clocked interval during which the comparison is made is dependent upon the number of signal trains to be inspected for a decision. For example, consider the case where a 20 character code having pulse widths and spacing of 4 microseconds each is used. This means that each pulse train is 160 microseconds long. Where a certain telemetry function requires five correctly repeated coded pulse trains out of a possible six to authorize operation, the clocked interval would be approximately 1 millisecond (i.e. 6 times 160=approximately 1 millisecond). Therefore, in the described example the comparator threshold level is set to base clip a fixed percentage, corresponding to the level of no intelligence signal, within the clocked interval of 1 millisecond.

It should also be realized that in many instances it may be satisfactory to use a 60 cycle, or other fixed time, clocked interval so that 60, or other fixed number, decisions per second are made by the comparator.

The output of the comparator 34, which is now waveforms 1, 3, 4 and 5, is applied to the input of a binary circuit 36 which reshapes the integrator output signals into their original transmitted pulse form, or as close as possible thereto. It should be realized that pulse 2 is discarded by the comparator 34 since it was a noise pulse which, when integrated fell below the acceptance level of comparator 34. Other pulses of this nature would also be discarded in the same manner.

The binary 36 may be any suitable circuit, for example, a Schmitt (cathode coupled) trigger or a transistor emitter-coupled binary circuit. The output of the binary 36 is a series of rectangular pulses which are essentially constant in amplitude and whose widths are dependent upon the duration of the signals at the output of the comparator 34. The comparator signals turn the binary "on" and "off" at time periods corresponding to their durations. When the binary 36 is "on" it produces the pulses 1, 3, 4 and 5 at the output thereof which correspond in width to the duration of the signals 1, 3, 4 and 5 at the output of the comparator 34. Therefore, the output of the binary 36 is pulse width modulated in accordance with the energy factor of the original signals in the composite wave 11.

To summarize the operation of the system so far, the sequential detector 13 states the probability of the occurrence of an intelligence signal. The "white noise" and other factors tend to shape or distort the amplitude and duration of possible intelligence signal pulses. Signals of lower energy factor than that established for passage by the comparator 34 are eliminated at that station so that an effective base for amplitude measurement of the information data is established. The binary 36 reshapes the integrated signal at the output of the comparator 34 so that measurement of its pulse width may be made. Therefore, this system is able to analyze the output of the binary 36 from the standpoint of energy above a predetermined magnitude, which is established by the comparator and for pulse recurrence or pulse width.

The output of the binary 36 is applied to the input of a pulse width discriminator 38 which measures the widths of the applied pulses and produces output signals having amplitudes proportional thereto. The output of the binary 36 may have pulses which are representative of interference and/or jamming signals. These pulses would be narrower than the intelligence signal pulses since they originally contain less energy. In order to discard these unwanted pulses accurate pulse width discrimination must be exercised. In a preferred embodiment of the invention, the pulse width discriminator 38 is of the type having sampling periods rather than a start and stop gate. An example of the former is shown in a copending application entitled "Pulse Width Sensor" by George Bruck et al., Serial No. 827,958, filed July 17, 1959, and which is assigned to the assignee of this application. A pulse width measuring system of the latter type, which will also operate with the system, is shown in the patent to Ault, No. 2,866,091. It should also be recognized that the type of pulse width discriminator disclosed by Bruck is less susceptible to jamming.

Where a pulse width discriminator similar to the one described by Bruck is used, its output is a stepped wave (shown in FIGURE 1), each step corresponding to one of the sampling periods. In a preferred embodiment of the invention, the sampling rate is made in the order of 4 per microsecond, each sampling period therefore equalling ¼ microsecond.

The output of the pulse width discriminator 38, which comprises signals whose amplitudes are proportional to the width of the pulses at the output of the binary 36, is applied to a threshold amplifier 40. The threshold amplifier 40 passes only those signals which are above its preset threshold. The threshold of the amplifier 40 is set to examine precisely and pass, above a level of possible error of time duration, signals corresponding to pulse widths of intelligence pulse signals. Pulses of less than a certain width, caused by noise signals, at the output of the binary 36, which produce signals of less than the threshold amplitude at the output of the discriminator 38, are not passed by the amplifier 40. In the example described, it should be noted that binary output pulse 5, which was a noise pulse, was not of sufficient width to produce a signal above the threshold level. Therefore, this pulse is discarded.

The output of the threshold amplifier, now containing only the intelligence signal pulses 1, 3 and 4, is applied to a power amplifier-driver 42 which amplifies the signal before it is applied to the commanded equipment 44. All of the other pulses, which contained noise or jamming signals are discarded on the basis of the time-amplitude product analysis performed by the system. Therefore, the signals fed to the commanded equipment 44 cannot erroneously trigger it off or fail to operate it.

The system of the present invention accepts the command signals, which are sometimes almost fully submerged in the noise background, and examines them from several attitudes and automatically discards all but those signals which are compatible with the established languages. In the example described, this language is a particular pulse width, with a pulse having an energy content above a pre-set level. The sequential analysis performed by the system of the invention can positively identify received signals buried some 20 db under the peak noise spectrum. Such intelligence signal discrimination has been unobtainable by the single amplitude or pulse width treatments commonly employed in the prior art. This amplitude-time product analysis, which amounts to the determination of the energy content in the signal pulse or modulation envelope also renders deception near to impossible. Thus, the reliability of the correct data transmission and reception is advanced toward a desired magnitude having a relatively small degree of error.

While the system is described with respect to a positive pulse from a zero type of signal, it should be realized that it is readily adaptable to essentially any type of modulation. The principles of operation of the system may be extended to any known type of communications. For example, FM type of transmitted signals may also be utilized with the system in a similar manner, by analyzing the energy content of the received FM pulses. The system will also handle noise signals which are wider than the desired intelligence pulses, as early as narrow noise pulses.

While a preferred embodiment of the invention has been described above it will be understood that this embodiment is illustrative only and the invention is to be limited solely by the appended claim.

What is claimed is:

A system for selecting intelligence data signal components in the form of pulses from a composite signal which also contains undesired signal components comprising a sequential detector for analyzing the probability of the occurrence of intelligence data signals in said composite signal, said detector producing signals representative of potential intelligence data and signals representative of the components of said composite signal which potentially contain no intelligence, a first threshold amplifier coupled to said sequential detector for passing only the potential intelligence data signals, an integrator circuit coupled to said first threshold amplifier for integrating the potential intelligence data signals to form waveforms representative of the energy content of the potential intelligence data signals, a comparator circuit coupled to said integrator for passing only portions of the integrated waveforms above a predetermined level corresponding to a minimum energy content for intelligence data, a binary circuit coupled to said comparator for converting the portions of the integrated waveforms passed by said comparator into pulses of a duration corresponding to the duration of the portion of the respective integrated waveform above the predetermined level of the comparator, a pulse width discriminator coupled to said binary circuit for producing signals of an amplitude corresponding to the duration of the respective pulses, and a second threshold amplifier coupled to said pulse width discriminator for passing only signals from said pulse width discriminator above a predetermined threshold level which corresponds to pulses of the duration of the original intelligence pulse signals.

References Cited in the file of this patent

UNITED STATES PATENTS

| | | |
|---|---|---|
| 2,599,586 | Ross | June 10, 1952 |
| 2,789,267 | Beal et al. | Apr. 16, 1957 |
| 2,849,183 | Kuck | Aug. 26, 1958 |
| 2,961,642 | Lamb | Nov. 22, 1960 |

UNITED STATES PATENT OFFICE
CERTIFICATE OF CORRECTION

Patent No. 3,086,174                      April 16, 1963

James R. Zoerner

It is hereby certified that error appears in the above numbered patent requiring correction and that the said Letters Patent should read as corrected below.

Column 3, line 37, the mathematical expression should appear as shown below instead of as in the patent:

$$\int_0^T [a^2 s^2(t) - 2ax(t)s(t)] dt$$

lines 45 and 56, for "1", each occurrence, read -- (1) --.

Signed and sealed this 12th day of November 1963.

(SEAL)
Attest:

ERNEST W. SWIDER                      EDWIN L. REYNOLDS

Attesting Officer                      Acting Commissioner of Patents